Figure 1:
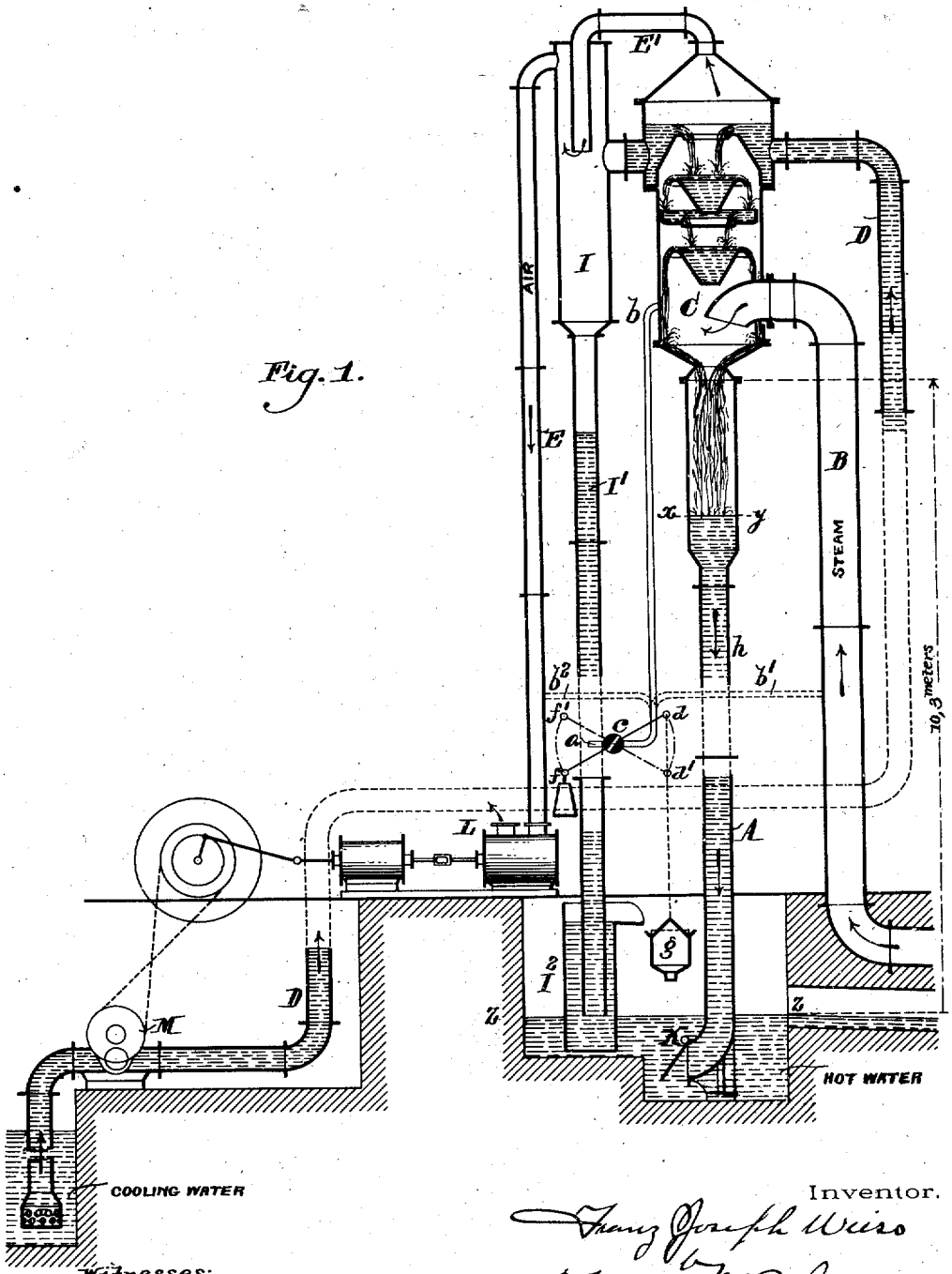

2 Sheets—Sheet 1.

F. J. WEISS.

CONDENSER.

No. 11,591. Reissued Mar. 2, 1897.

Inventor.

Franz Joseph Weiss by Francis T. Chambers his Attorney.

Witnesses:

Henry Dancy

D. Stewart

2 Sheets—Sheet 2.

F. J. WEISS.

CONDENSER.

No. 11,591. Reissued Mar. 2, 1897.

Witnesses:

Inventor.

Franz Joseph Weiss by Francis T. C. Lambert his Attorney.

UNITED STATES PATENT OFFICE.

FRANZ JOSEPH WEISS, OF BASLE, SWITZERLAND.

CONDENSER.

SPECIFICATION forming part of Reissued Letters Patent No. 11,591, dated March 2, 1897.

Original No. 496,761, dated May 2, 1893. Application for reissue filed September 21, 1896. Serial No. 606,598. Patented in England September 17, 1892, No. 16,670, and in Germany March 11, 1893, No. 67,485.

*To all whom it may concern:*

Be it known that I, FRANZ JOSEPH WEISS, of Basle, in the canton of Basle and Republic of Switzerland, have invented a new and useful Improvement in Condensers, (for which I have obtained a German patent, No. 67,485, dated March 11, 1893, and a British patent, No. 16,670, dated September 17, 1892,) of which the following is a specification, reference being had to the accompanying drawings, which form a part thereof.

This invention relates to the condensation of steam and other vapors and to apparatus therefor.

It has for its object to obviate a defect which is associated with the use of counter-current condensers and occurs whenever they operate with the greatest efficiency and therefore under the most favorable conditions. If in a condenser a certain weight of steam coming from a steam-engine, an evaporating apparatus, or the like is mixed with a certain weight of water of a certain temperature, the liquid mixture possesses a definite temperature, which is always the same whatever may be the system on which the condenser is arranged. In case, however, the apparatus is a counter-current condenser the pressure prevailing therein may be completely lowered by an air-pump of suitable size to the pressure of saturated vapors corresponding to the temperature of the liquid measure, (the hot water running off,) whereas that is physically impossible in the case of a parallel-current condenser, and likewise with any condenser having a "wet" air-pump, or could only be attained with an indefinitely large air-pump. The state in counter-current condensation in which the vacuum has been completely raised to that which corresponds to the temperature of the hot water running off, and where, therefore, the condensation performs its maximum duty or works with a degree of efficiency of one hundred per cent., is hereinafter called the "ideal point."

Experience has shown that with properly-arranged counter-current condensers the said ideal point is easily attainable at any time and is actually attained, but when such is the case the remarkable phenomenon occurs that the water in the condenser rises and enters the air-suction pipe, terminating at the top of the same. If between the condenser-body and the air-pump, which with counter-current condensation must always be a "dry" one, no so-called "water-separator" is included, the water passes over into the dry air-pump in enormous quantities, so that the air-cylinder is completely filled thereby, and as this pump in the nature of things is not arranged for the delivery of water serious disturbances in the working, if not the destruction, of the air-pump are the immediate consequences. In case, however, a water-separator as shown in the drawings, which must be placed sufficiently high for the water which passes over into it and is separated from it to be automatically drawn off by a water-barometer pipe, and if this water-barometer pipe or waste-pipe is wide enough for carrying off all the water which has passed over no water will pass into the air-pump.

Figure 2:
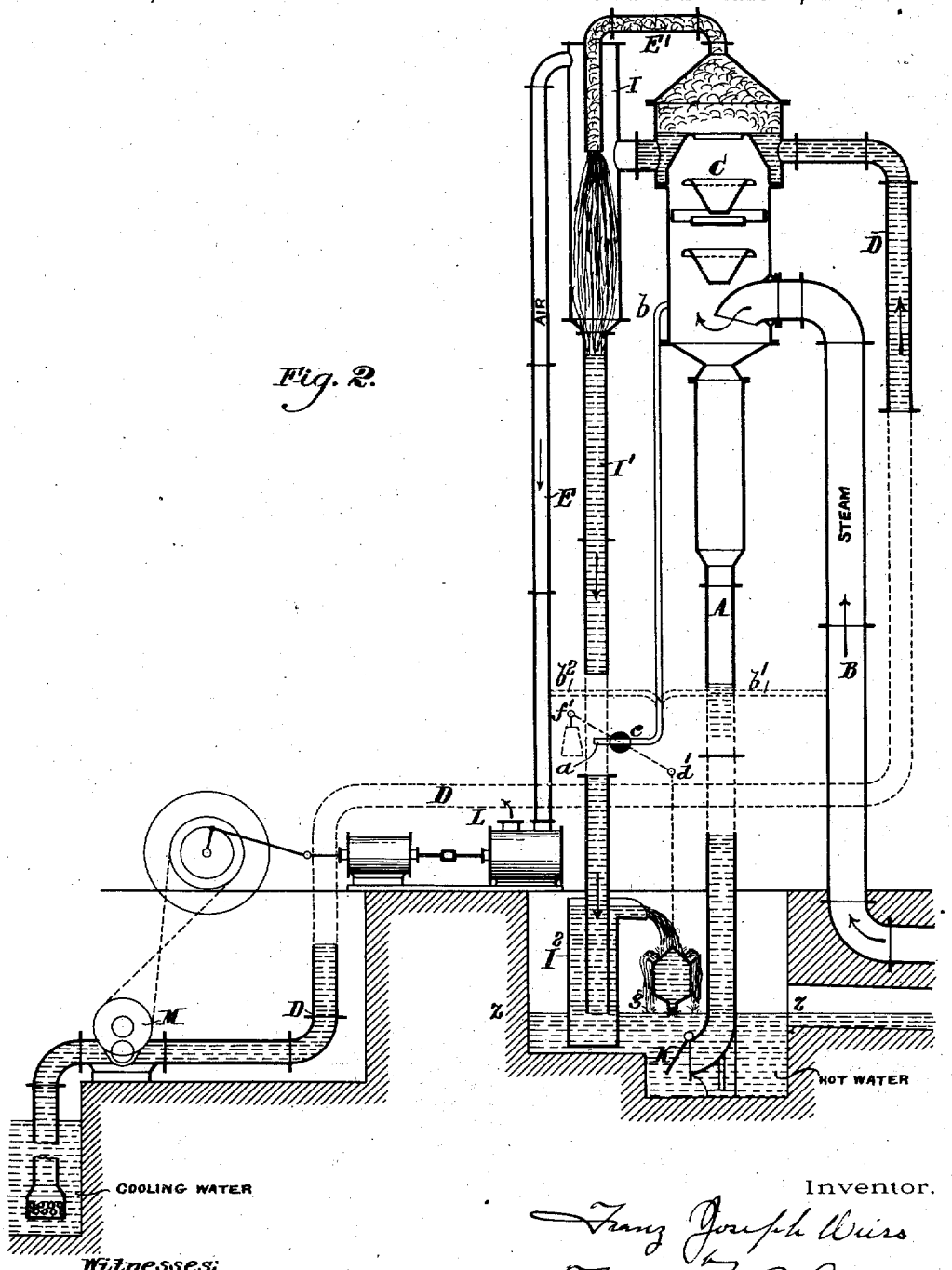

It has been found that as soon as the ideal point is reached, or, perhaps, even somewhat exceeded, and water therefore passes over the entire quantity of water conducted to the condenser passes over into the water-separator, not a drop of water passing through the waste-pipe proper. The steam condenses in a pipe on its way from the counter-current condenser to the water-separator, which it traverses, together with the water, (or parallel to it.) In other words, when reaching the ideal point the (counter-current) condensation shifts from the (counter-current) condenser-body proper to the water-separator, as shown in Figure 2 of the drawings, and thus becomes a parallel-current condensation. Accordingly the water-pipe from the water-separator (or, more correctly, from the parallel-current condenser body) must be made of such width that with the available weight of water it is capable of carrying off all the condensed steam and condensing water. Then the air-pump is protected in all cases against access of water.

It has further been found that if once the passage of water to the separator has commenced and the condensation has changed from a counter-current condensation to a parallel-current condensation this state will never cease of itself but will continue until the condensation is stopped. From this results the following inconvenience—that is to say, as under otherwise similar circumstances (equal quantity of the steam to be condensed, equal quantity of cooling water, equal temperature of the cooling-water, equal capacity of the air-pump,) a lower vacuum is always produced with a parallel current than with a counter-current, the vacuum sinks in the condenser during the state just explained where the condensation takes place by parallel current.

My invention consists in the combination, with counter-current condensers, of means for bringing the above state, if it has occurred, rapidly to a termination and for shifting the condensation back again to the condenser-body proper, where it takes place again by counter-current, without any necessity for stopping the condensation, all as hereinafter more fully described with reference to the accompanying drawings, in which—

Figs. 1 and 2 are vertical sectional views of a condenser embodying my invention, showing the apparatus in two stages of its operation.

According to my invention I effect the shifting from the parallel-current mode of operation by lowering the vacuum in the condenser to such a degree as to cause an interruption of the work of the condenser, whereupon, of course, the water will cease to flow through the air-suction pipe and will resume its normal flow downward through the condenser-body. The lowering of the vacuum in the condenser I effect by admitting air to it in any convenient manner. Thus, as illustrated, I provide a pipe *a b*, open at *a* to the atmosphere and at *b* opening into the condenser, and I provide at *c* a cock or valve by which this pipe can be opened or closed at will.

Instead of passing to the main condenser-body C the pipe may open into the steam-pipe B, as indicated in dotted lines at $b'$, or, again, it may open into the exhaust-air pipe E, as indicated in dotted lines at $b^2$. In the first of these suggested modifications the opening of cock *c* obviously floods the condenser with air, just as in the case where it is admitted directly to the condenser-body, and in the second case the admission of air to pipe E obviously has the same effect as its admission to the condenser-body in that it, by flooding the exhaust-pipe with air, cuts off the suction in the condenser-body and thus causes the vacuum to fall therein. When, therefore, I speak of admitting air into the condenser or into the interior or spaces or pipes of the condenser, I desire to be understood as not referring to any particular part, space, or pipe, but to any part of the apparatus or pipes in connection with the same wherein the air is rarefied or exhausted and wherein the collection of air would have the effect of lowering the vacuum. In the following manner these means are rendered automatic and immediately operative as soon as the running of water through the current-body I begins. The water-barometer waste-pipe I′ is arranged so as to terminate in a basin or vessel $I^2$, Fig. 1, which has an outlet a little above the surface *z z* of the hot water running off the condenser-body or a connected part being connected with the atmosphere through the pipe *a b*, having a cock *c* inserted, which is usually kept closed by the counterweight attached at *f* to the lever *f′ d′* for actuating the cocks. From the other end *d* is suspended a pail *g* in such manner that water must run into it as soon as the vessel $I^2$ runs over. The pail *g* has at its bottom an opening, which always remain open. As soon as the ideal point is reached and the condensation shifts from C to I, so that the whole volume of water runs off through I′, the pail *g* becomes filled, (despite of its having an opening below, because the latter is too small for the entire volume which passes over to prevent the immediate filling of the pail,) the weight of the volume of water filling it overcomes the counterweights *f*, turns the said lever to the position *f′ d′*, and opens the cock *c*, as shown in Fig. 2, whereby, owing to lowering of vacuum in the condenser-body, the condensation is at once shifted back to C again and the running of the water through I I′ ceases. The pail *g* therefore no longer contains water. It is now emptied at once through the opening below, which always remains open, and the counterweight *f* closes the cock *c* again, as shown in Fig. 1. This state lasts until the ideal point is reached the next time, whereupon the same operation recommences. Longer and longer periods, during which the condensation takes place by the counter-current, which acts under more favorable conditions, alternate with very short periods, during which the condensation takes place by the parallel current, which acts under less favorable circumstances.

In the arrangements illustrated the descending pail *g* opens the cock *c* if the water comes down through pipe I′ and allows air to pass into the body C of the condenser, and obviously the same result will be attained if air is admitted into spaces or pipes in connection with the condenser-body, as, for instance, into the air-suction pipe E or into the steam-pipe B. By reason of the vacuum which momentarily sinks a little owing to the admission of air the condensation immediately shifts from the body I back again to the body C, the water discontinuing to pass through I and I′, the pail *g* is emptied and the cock *c* is closed again, as hereinbefore described with reference to Figs. 1 and 2.

In lieu of the cock *c* shown I may use any other suitable closing device—for instance, a lift-valve, slide-valve, or the like—which is opened by the descending pail, and then closed again by a counterweight or by an equivalent spring.

Having now described my invention, what

I claim as new, and desire to secure by Letters Patent, is—

1. The method of condensing steam and other vapors, which consists in exhausting or rarefying the air in the condenser, causing the condensing water and steam to pass through the condenser in counter-currents alternating with parallel currents, and temporarily admitting air into the condenser to lower the vacuum and bring the parallel-current condensation back to condensation by counter-currents.

2. The method of condensing steam and other vapors, which consists in exhausting or rarefying the air in the condenser, causing the condensing water and steam to pass through the condenser in counter-currents alternating with parallel currents, and temporarily admitting air into the pipes in connection with the condenser to lower the vacuum and bring the parallel-current condensation back to condensation by counter-currents.

3. In a counter-current condenser the combination with the air-suction pipe of the condenser of a water-barometer pipe I′ a connection between the interior of the condenser and the outer air, a pail suspended below the overflow of the water-barometer waste-pipe and means as described for temporarily opening the connection to the outer air said means being actuated by the weight of the water flushing into the pail, substantially as specified.

4. In a counter-current condenser the combination with the air-suction pipe of the condenser of a water-barometer waste-pipe I′ a connection between the air-suction pipe and the outer air, a pail suspended below the overflow of the water-barometer waste-pipe and means as described for temporarily opening the connection to the outer air, said means being actuated by the weight of the water flushing into the pail, substantially as specified.

FRANZ JOSEPH WEISS.

Witnesses:

GEORGE GIFFORD,
EMIL PARAVICNER.